Sept. 13, 1966 E. F. C. SCHULZE 3,272,498

INTERMITTENT DRIVE FOR CARD FEED DEVICES OR THE LIKE

Filed June 12, 1964 6 Sheets-Sheet 1

INVENTOR.
ERWIN F.C. SCHULZE
BY Russell L. Root
ATTORNEY.

INVENTOR.
ERWIN F. C. SCHULZE

BY Russell L. Root

ATTORNEY.

INVENTOR.
ERWIN F. C. SCHULZE
BY Russell L. Root
ATTORNEY.

Sept. 13, 1966 E. F. C. SCHULZE 3,272,498

INTERMITTENT DRIVE FOR CARD FEED DEVICES OR THE LIKE

Filed June 12, 1964 6 Sheets-Sheet 4

INVENTOR.
ERWIN F.C. SCHULZE
BY Russell L. Root
ATTORNEY.

INVENTOR.
ERWIN F.C. SCHULZE
BY Russell L. Root
ATTORNEY.

INTERMITTENT DRIVE FOR CARD FEED DEVICES OR THE LIKE

Filed June 12, 1964

INVENTOR.
ERWIN F.C. SCHULZE
BY Russell L. Root
ATTORNEY.

3,272,498
INTERMITTENT DRIVE FOR CARD FEED DEVICES OR THE LIKE

Erwin F. C. Schulze, Novelty, Ohio, assignor to Addressograph-Multigraph Corporation, Cleveland, Ohio, a corporation of Delaware Filed June 12, 1964, Ser. No. 374,767
17 Claims. (Cl. 271—8)

This invention relates to a new and improved drive mechanism adaptable for card feeds for business machines, or other devices having similar requirements, and more particularly to a novel drive and control assembly for actuating a high speed card feed or like mechanism that is adaptable to both demand operation and continuous operation as in the feeding of record cards or similar business instruments to a business machine.

In high speed business machines, with operation based upon the sensing and utilization of coded information carried by record cards or similar business instruments, one of the principal limiting factors with respect to over-all speed is the maximum operating speed of the card feed mechanism employed to feed record cards one-by-one to the machine. Usually, it is necessary to provide some form of clutch mechanism for initiating and interrupting the card feed. In many business machines, where the cards are fed through the machine at a steady rate throughout the machine operation, the clutch for the card feed mechanism is used but seldom. Under these conditions, clutch life is not a particular problem, even though the machine may operate at very high speeds.

In other applications, however, it may be desirable to feed the cards to the machine on a demand basis, the feeding of each card being dependent upon the performance of a preceding operation in the machine. This mode of operation requires engagement and disengagement of the clutch for the card feed mechanism in each card feed cycle. The resulting great increase in the number of operating cycles for the clutch, relative to the number of cards fed through the machine, frequently results in excessive wear and premature failure of the clutch. This is especially true where high speed operation is required, since the clutch is subject to substantial shock loading at the beginning of each card feed cycle and at the end of each cycle.

In some business machines, it may be desirable to provide for both continuous and demand operation, particularly where the business machine is capable of performing a variety of different functions. This requirement can be accommodated by slowing down the speed of operation of the card feed mechanism and by providing a relatively large and rugged clutch, but this produces an undesired limitation on the speed of the machine when processing cards continuously. On the other hand, if conventional drive and control apparatus are employed for the card feed mechanism, in a machine that must operate both on a continuous basis and on a demand basis, the card feed clutch may be subject to premature failure if high speed operation is attempted.

It is a principal object of the present invention, therefore, to provide a new and improved drive and control assembly for actuating a high speed card feed mechanism, or other similar mechanism, that is readily adaptable to both continuous and demand operation without requiring a sacrifice of speed for the continuous operation and without incurring the possibility of premature failure due to demand operation.

A more specific object of the invention is to provide a new and improved shock absorption device that reduces the inertial shock applied to the operating clutch of a high speed card feed mechanism both upon starting of the card feed mechanism and upon interruption of its operation.

A more specific object of the invention is to provide a torsion bar device for absorbing and storing the inertial energy of a card feed mechanism, upon interruption of the card feed, that is capable of utilizing the same stored energy upon initiation of the next card feed cycle to reduce inertial shock at the start of that succeeding cycle.

Another object of the invention is to afford a compact torsion bar shock absorption and energy storage device, in a drive and control assembly for actuating a high speed card feed mechanism, that occupies a minimum of space. This object of the invention is realized in part by adoption of a structural arrangement in which the torsion bar employed for energy storage and shock absorption is disposed in telescoped coaxial arrangement with one of the main operating shafts of the card feed mechanism.

Another object of the invention is to incorporate a positive drive connection in a drive and control assembly for actuating a high speed card feed mechanism, together with a torsion bar shock absorption assembly, making it possible to operate the mechanism on a continuous basis without requiring the maintenance of a driving connection through the torsion bar.

A corollary object of the invention is to provide a new and improved electromagnetic actuating device for a high speed card feed mechanism that permits rapid initiation and interruption of individual card feed cycles.

Throughout this specification and in the appended claims, there are numerous references to record cards and to a card feed mechanism. It should be understood that the term "record cards" as employed herein is applicable to other similar business instruments, including checks, individual record films and the like.

In each of FIGS. 1 through 6, the operating members of the card feeding mechanism are shown in the relative positions achieved during operation in the mid-portion of a card feed cycle. FIGS. 7 through 10, on the other hand, illustrate a stopped condition for the apparatus, prior to initiation of a card feed cycle.

Figure 1:
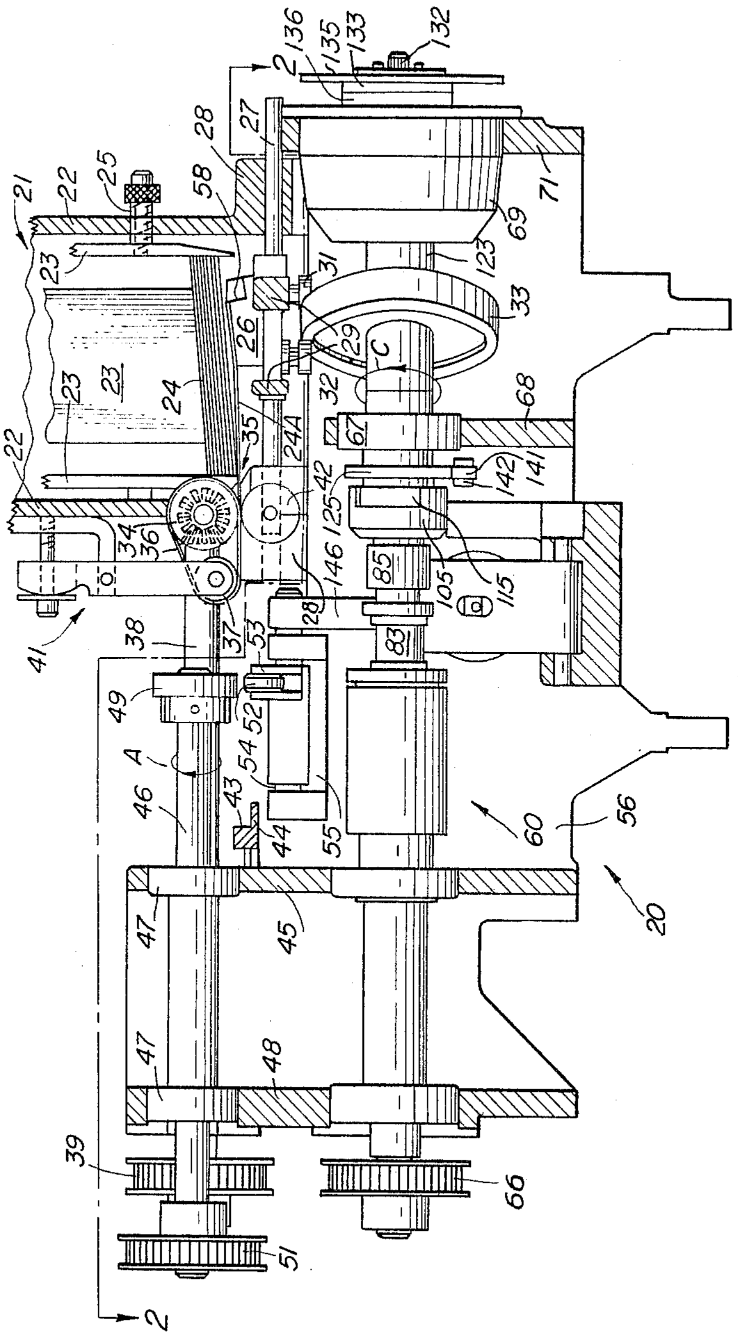
FIG. 1 is an elevation view, partly in cross-section, of a card feeding mechanism constructed in accordance with one embodiment of the present invention.

The elevation view of FIG. 1 illustrates a card feeding apparatus 20 constructed in accordance with a preferred embodiment of the present invention. In the upper right-hand corner of the apparatus, as illustrated in this figure, there is located a card hopper or magazine 21 comprising a series of vertically extending frame members 22 provided with suitable internal guides 23 within which a supply of record cards 24 may be stored. The guides 23 may be provided with suitable adjustment devices, such as the adjusting device 25, for positioning the guides so that they engage the edges of the cards 24 to hold the cards in aligned position within hopper 21.

At the bottom of hopper 21 there is located a reciprocating picker knife 26. The picker knife 26 is affixed to a pair of elongated shafts or support members 27, the opposite ends of the shafts 27 being slidable in bearings provided in suitable bosses 28 on the front and rear frame members 22 of the card hopper. Only one of the shafts 27 is shown in the drawing. In the illustrated arrangement, the means utilized comprises a transverse carriage 29 that extends between the two shafts, the carriage 29 also serving to support a pair of vertically depending cam follower rollers 31 and 32 that engage the opposite sides of an axial displacement cam 33.

At the left-hand side of hopper 21 and as illustrated in FIG. 1, there is located a roller 34 on an axis parallel to and adjacent an outlet opening 35 at the base of the hopper, the opening 35 being aligned approximately with the top surface of picker knife 26. The roller 34 is encompassed by a drive belt 36 that also extends around an idler roller 37. The remote end of roller 34, as viewed in FIG. 1, carries a bevel gear that is engaged by a complementary gear mounted upon a drive shaft 38. The drive shaft 38 is continuously driven, during operation of the machine, by a suitable drive mechanism comprising a pulley 39 mounted on the left-hand end of the shaft. A tensioning mechanism 41 is provided for idler roller 37 to maintain drive belt 36 under the proper tension. A freely rotatable roller 42 is located immediately below roller 34 and cooperates with the belt 36 in feeding cards from hopper 21 as described more fully hereinafter.

A card stop and support member 43 is disposed in alignment with the outlet aperture 35 for the card hopper 21. Member 43 includes a shelf-like projection 44 for supporting the individual cards at an intermediate position in the feeding operation. Member 43 is fixedly mounted, by suitable means, to a frame member 45.

A drive shaft 46 is mounted in suitable bearings 47 in the frame member 45 and in a further frame member 48. The right-hand end of shaft 46 constitutes a cantilever projection of the shaft and carries a feed roller 49 at its outer end. The left-hand portion of shaft 46 projects beyond frame member 48 and is provided with a drive pulley 51 through which the shaft 46 is continuously rotated, the direction of rotation being indicated by the arrow A.

Figure 2:
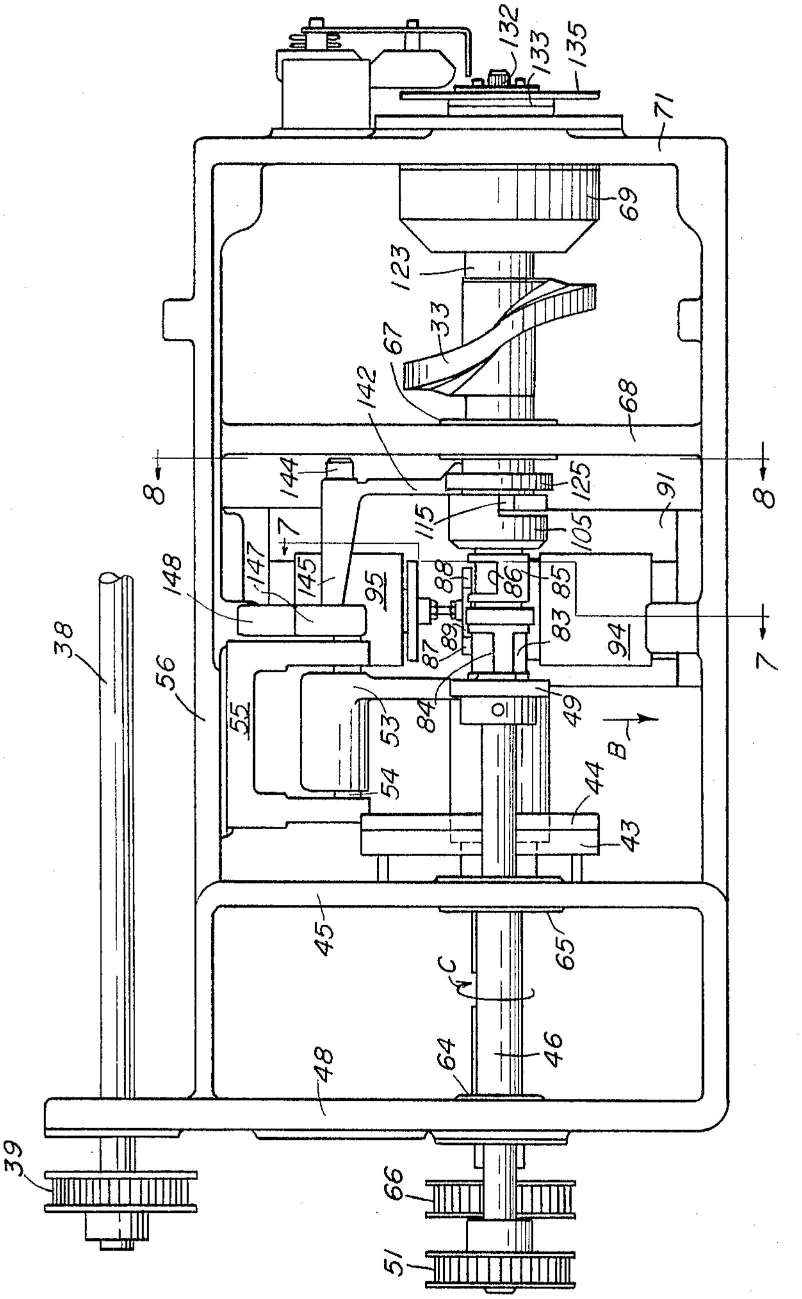
FIG. 2 is a plan view of the card feeding mechanism, with the card stack removed to illustrate the operating components of the mechanism more clearly, taken approximately along line 2—2 in FIG. 1.

Feed roller 49 is located immediately above an idler roller 52. The idler roller 52 is supported upon a cantilever arm 53. As shown in FIGS. 1 and 2, the roller support lever 53 is mounted upon a shaft 54, the shaft 54 in turn being supported in suitable bearings in a U-shaped bracket 55 mounted upon a transverse frame member 56. As shown in FIG. 1, the idler roller 52 is normally spaced from drive roller 49 by a thickness greater than an individual card 24. However, the lever 53 may be pivoted, by rotation of shaft 54, to move the roller 52 upwardly toward roller 49 to complete a feeding operation in the card feed mechanism as described hereinafter.

At the outset of a card feeding operation, it may be assumed that the card picker knife 26 (FIG. 1) is located at the extreme right-hand end of its travel, the picker edge 58 of the knife then being located just beyond the right-hand edge of the stack of cards 24. From this position, the picker knife is driven to the left in FIG. 1, engaging the right-hand edge of the lowermost card 24 and driving the card toward the opening 35 constituting an outlet for the card hopper. In FIG. 1, the picker knife 26 is shown at an intermediate position with the card 24A about to engage the drive belt 36 in the bight between the rollers 34 and 42.

From the position illustrated in FIG. 1, the picker knife 26 continues movement to the left, moving the card 24A into engagement with belt 36 and roller 42. The continuously driven belt, in cooperation with the support roller, continues the leftward movement of the card, propelling it rapidly outwardly of the card hopper. This movement of the card continues until the card hits the stop and guide member 43, the card coming to rest on the shelf 44 and with the medial portion of the card directly above the idler roller 52.

Immediately after the card comes to rest upon the shelf member 44, the idler roller 52 is moved upwardly by pivotal movement of its support lever 53. When this occurs, the card is brought into engagement with the continuously driven feed roller 49. Consequently, the card is driven outwardly of the feed mechanism as illustrated in FIG. 1, corresponding to the movement of the card indicated by arrow B in FIG. 2.

A key problem to which the present invention is directed is the accurate and effective control of the movements of picker knife 26 and idler roller 52 to perform the above-described operations for card feed at high speed. Moreover, it is necessary that this high speed operation be effectively synchronized both for intermittent "demand" card feeding and for continuous synchronized card feeding. This operation is accurately and effectively controlled at card speeds in excess of 650 cycles per second, where a stop is required in each cycle, and at substantially higher speeds for continuous card feeding, by the control shaft assembly 60 that drives the axial displacement cam 33 and that actuates the idler roller 52, as described more fully hereinafter.

The left-hand portion 61 of the control shaft assembly 60 (see FIGS. 3 and 4) comprises a drive shaft and clutch mechanism including an input drive shaft 63 that is supported in two bearings 64 and 65 mounted in the frame members 48 and 45 respectively (see FIG. 1). The left-hand end of shaft 63 has a drive pulley 66 mounted thereon to afford a convenient means for continuously rotating the shaft. The right-hand end of shaft 63 carries a one-revolution clutch, described more fully hereinafter, that is used to couple the drive shaft to a torsion bar assembly 62 that constitutes the right-hand portion of the overall control shaft assembly 60. The torsion bar section 62 of control shaft assembly 60 is supported by means of a bearing 67 that is mounted in an intermediate frame member 68 (see FIG. 1) and by a hub or mounting cup 69 that is mounted in an end frame member 71.

Figure 3:
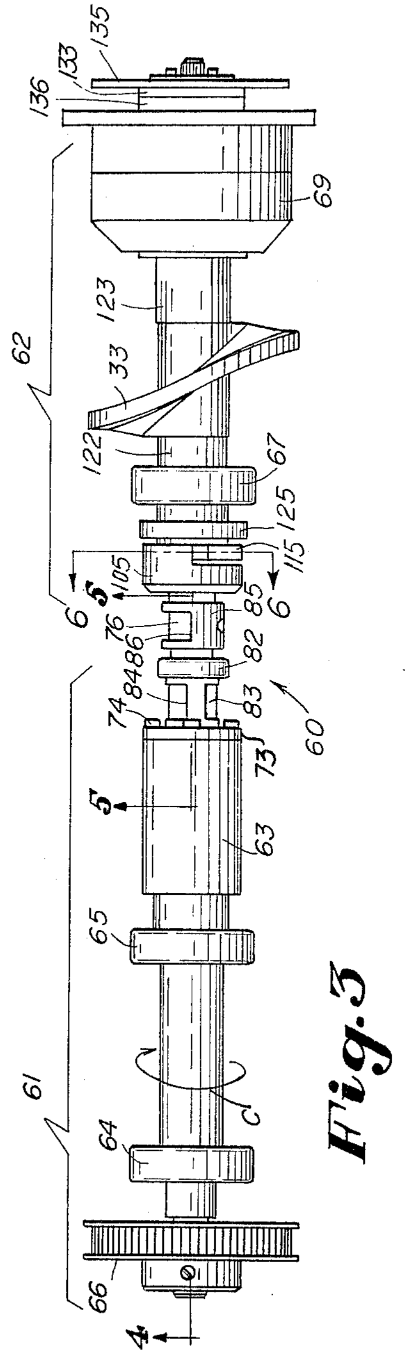
FIG. 3 is a plan view of a torsion bar shock absorption device and associated clutch constituting a part of the card feed mechanism.
Figure 4:
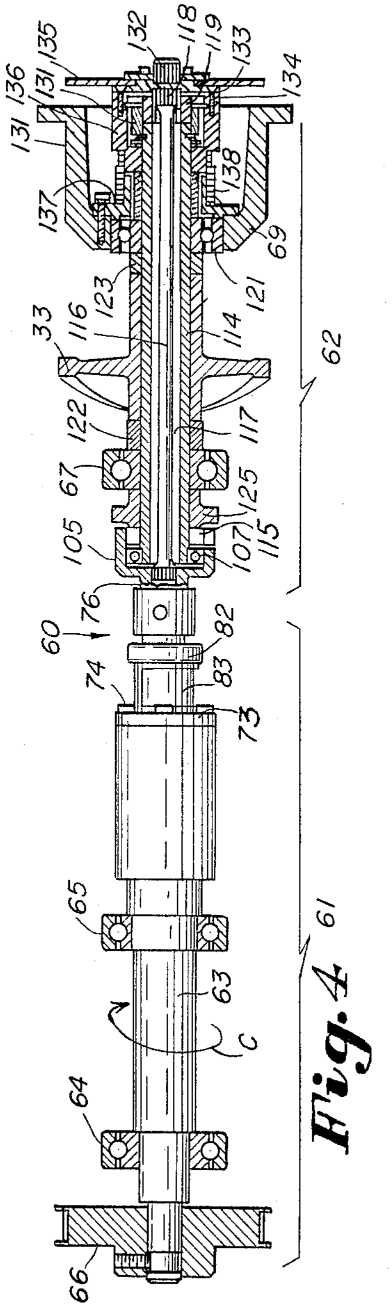
FIG. 4 is an elevation view, partly in cross section, of the apparatus of FIG. 3.
Figure 5:
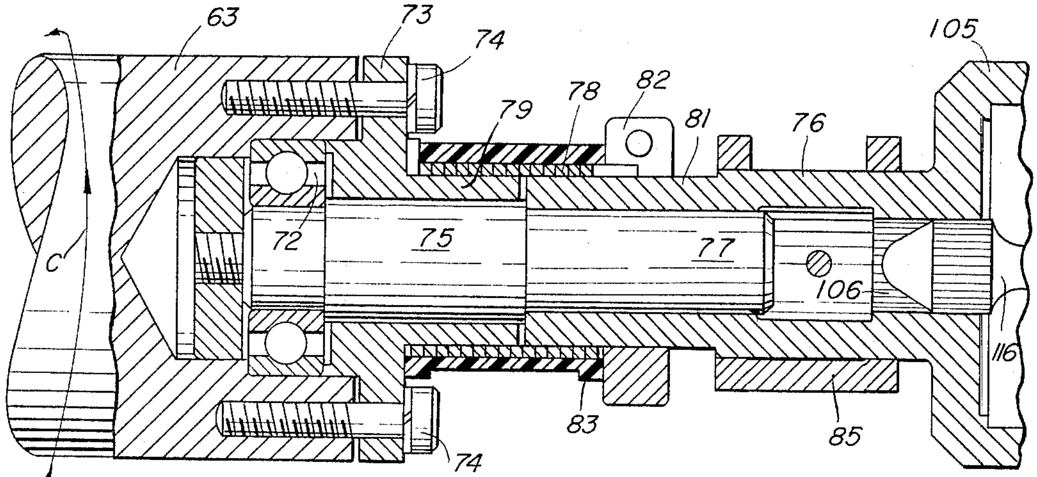
FIG. 5 is a detail sectional view of a clutch mechanism incorporated in the card feed apparatus and is taken approximately along line 5—5 in FIG. 3.

The drive shaft and clutch section 61 of control shaft assembly 60, complete with clutch mechanism, is shown in detail in FIGS. 3–5. As illustrated in FIG. 5, the right-hand end of the drive shaft 63 is provided with an axial aperture within which an anti-friction bearing 72 is mounted. Bearing 72 is clamped in place within the axial aperture in shaft 63 by means of an end plate and shaft extension member 73 that is secured to the drive shaft 63 by a plurality of retaining screws 74. The clamping action of member 73 secures the outer race of ball bearing 72 to the drive shaft 63 for the rotation therewith. The inner race of the bearing 72 is press fit or otherwise secured to an extension shaft 75 that projects outwardly of the shaft member 73 through an axial opening in the shaft member 73. It should be noted that the shaft 75 is freely rotatable within the axial aperture in member 73. There is no driving connection between the members 73 and 75, member 75 being utilized only to align the extension portion 73 of the drive shaft 63 with a connecting or control shaft 76 that constitutes a part of the torsion bar section 62 of control shaft assembly 60. Thus, the right-hand end portion 77 of the shaft 75 fits within an axial aperture in the control shaft 76, effectively aligning the two shaft members 73 and 76 with each other.

A clutch is provided for affording a driving connection between the extension portion 73 of drive shaft 63 and the control shaft 76 that is aligned therewith. The clutch mechanism comprises a spring 78 that is wrapped around the end portions 79 and 81 of the shaft members 73 and 76, respectively. One end of the spring 78 is engaged in a recess in a collar 82 that is adjustably clamped upon the shaft member 76. The other end of the spring 78 projects radially into a plastic operating sleeve 83 having a stop surface 84 (see FIG. 3). When in a free condition, the clutch spring 78 is in light frictional engagement with both of the shaft extension members or hubs 79 and 81.

The clutch mechanism further includes a collar 85 fixed to control shaft 76 and having an axially extending laterally facing stop surface 86, as shown in FIG. 3. The stop surface 86 is normally disposed a few degrees behind the stop surface 84 in the direction of rotation of the control shaft assembly 60, which is indicated by the arrows C in FIGS. 1–6.

As shown in FIG. 2, the stop surfaces 84 and 86 are engageable by a pair of dogs 87 and 88 respectively. Dogs 87 and 88 constitute integral parts of a bifurcated operating lever 89 that is controlled by an electromagnetic operator mechanism 90 illustrated in FIG. 7. The electromagnetic operator mechanism 90 includes the lever 89, which is pivotally mounted upon a base 91 suitably secured to the frame of the card feed mechanism. The medial portion of lever 89 is pivotally connected to a pair of operating rods 92 and 93. The operating rod 92 extends axially of and forms a part of the armature assembly of a "stop" electromagnet 94. The rod 93, on the other hand, extends through and is a part of the armature assembly for a "start" electromagnet 95.

Figure 7:
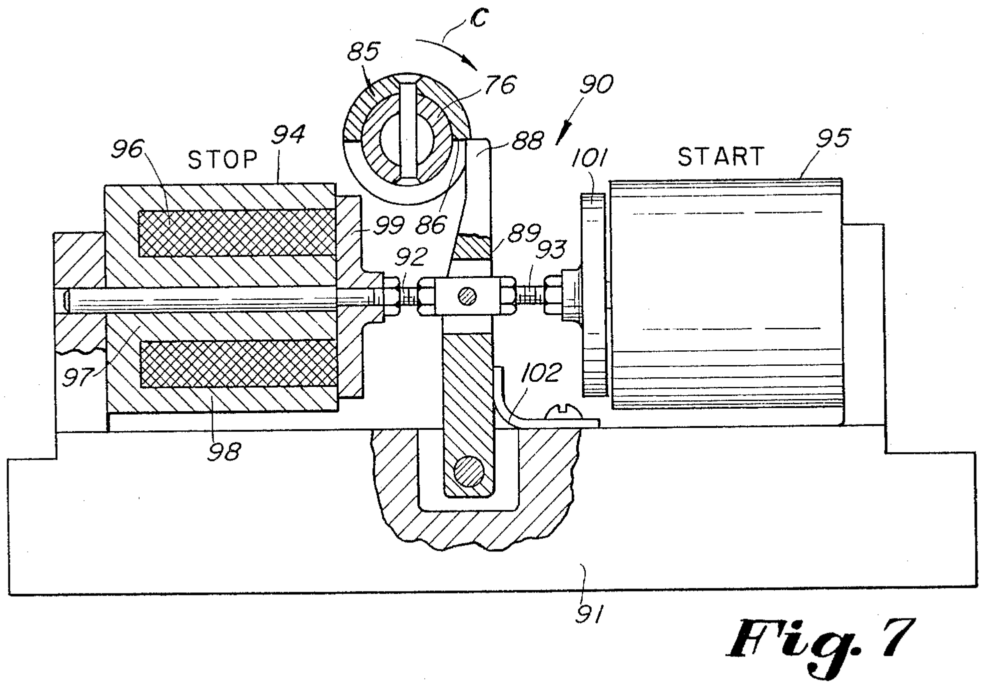
FIG. 7 is a detail sectional view taken approximately along line 7—7 in FIG. 2.

The "stop" electromagnet 94 is shown in sectional detail in FIG. 7. It includes an operating coil 96 wound upon a central core 97 of magnetic material, the core 97 projecting axially of a cup-shaped magnetic housing 98. The operating rod 92 extends through an axial opening in the core 97 and has an armature member 99 affixed thereto. The armature member 99 is attracted toward the magnet assembly comprising the core 97 and the housing 98 upon energization of the operating coil 96. A similar construction, including an armature member 101 mounted upon the operating rod 93 is provided for the start electromagnet 95. A spring 102 mounted on base 91 biases lever 89 toward the stop position illustrated in FIG. 7.

Figure 6:
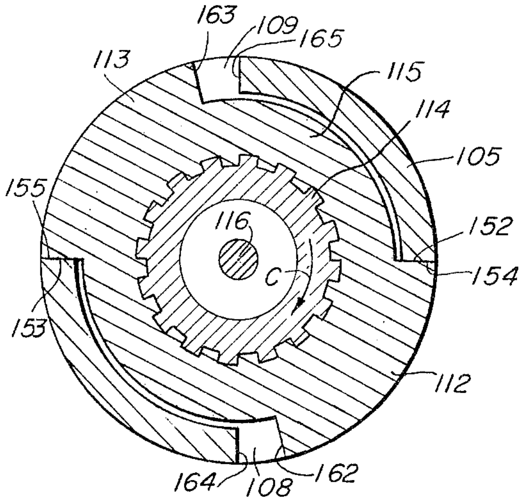
FIG. 6 is a detail sectional view taken approximately along line 6—6 in FIG. 3.

The torsion bar section 62 of control shaft assembly 60 starts with the control shaft 76 and is best illustrated in FIG. 4. The right-hand portion of control shaft 76 terminates in a hub 105 having an internally splined axial opening 106 (see FIG. 5). A ball bearing 107 is mounted within the hub 105, the hub being of substantially cup-shaped configuration. The lip portion of the hub 105 is provided with two arcuate slots 108 and 109, as best shown in FIG. 6, which receive a pair of arcuate shoulder members 112 and 113, respectively, on a collar 115 mounted on an externally splined operating shaft 114. This construction affords a means for completing a driving connection between the shafts 76 and 114 while permitting limited relative rotation between the two shafts, as described more fully hereinafter. The shaft 114 is externally splined throughout most of its length for driving connection with a number of other parts as will presently appear.

The splined recess 106 in the control shaft 76 receives the splined end of a torsion bar 116 that extends through an elongated axial opening 117 in the operating shaft 114. The spline connection is best illustrated in FIG. 5 and the location of the torsion bar within shaft 114 is best shown in FIG. 4. The right-hand end of the torsion bar 116 is provided with a further splined coupling 118 into a collar 119 that is aligned with the right-hand end of the operating shaft 114.

A bearing 121 is provided to support the right-hand portion of the shaft 114, the bearing 121 being mounted in a suitable opening in the fixed support hub 69. It is the operating shaft 114 that carries the axial displacement cam 33. The externally splined construction adopted for operating shaft 114 affords a convenient means for mounting the cam on the shaft for rotation therewith, the axial location of the cam being determined by a pair of spacer bushings 122 and 123 spacing the central portion of the cam from the internal races of the two bearings 67 and 121 respectively. The operating shaft 114 also carries a cam 125 which has a splined connection therewith and is employed to actuate the operating lever carrying the guide roller 52 (FIG. 1) as described more fully hereinafter.

The long operating shaft 114 is connected to the torsion bar 116 by means of the collar 119 and a sleeve 131. The collar 119 is of the same diameter as the shaft 114 and is provided with an external spline that matches the splined external surface of the operating shaft 114. The sleeve 131, on the other hand, is constructed with an internal splined configuration that is complementary to the collar 119 and the shaft 114. Thus, the sleeve 131 fits over the exterior splines on the shaft 114 and the collar 119 and locks the two together.

The right-hand end of the torsion bar 116 is extended beyond the collar 119 and is provided with a splined fitting 132 or other suitable fitting for connecting the torsion bar to a wrench or tool. The external fitting 132 makes it possible to adjust the torsion bar 116 to a predetermined preset torque having a value suited to the design of the machine. The multiple spline arrangement interconnecting the shaft 114, the sleeve 131, and the collar 119 makes it possible to adjust the preset torque of the torsion bar 116 in small increments when the internal and external splines of collar 119 are selected to have slightly different angular pitch. After adjustment of the angular position of torsion bar 116 relative to shaft 114 to achieve the desired pre-torque (a distance of approximately 6° in a representative case), the sleeve 131 is inserted into the position shown in FIG. 4 to hold the shaft and the collar 119 against relative rotation. When this has been done, a slotted mounting disc 133 is interlocked with an annular groove in the torsion bar 116 and then mounted upon a sleeve 136 drivingly carried by the operating shaft 114, being held in position on the sleeve by a series of mounting screws 134 or other suitable means. Disc 133 serves as a support for an indicator disc 135 employed to show the angular position of shaft 114 from its theoretical home position.

An anti-backup or holding device is incorporated in the mounting hub 69. It comprises a sleeve 137 that is affixed to the hub and that is disposed in alignment with sleeve 136. A spring 138 is wrapped around the two sleeves 136 and 137 in surface contact with both to afford a simple one-way clutch resisting reverse rotation of the sleeve 136 and, accordingly, holding the operating shaft 114 against reverse rotation.

Figure 8:
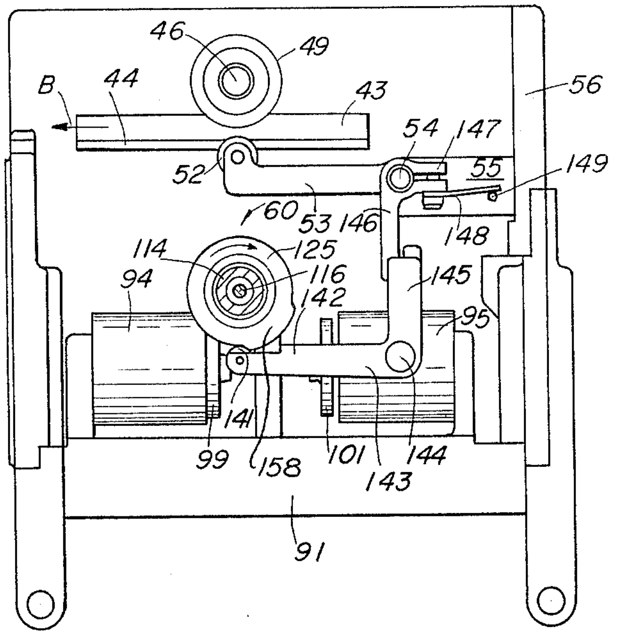
FIG. 8 is a sectional elevation view taken approximately along line 8—8 in FIG. 2.

FIG. 8 illustrates the operating mechanism that controls the vertical movement of the idler roller 52. As shown therein, the cam 125 on the torsion bar section of the control assembly 60 is engaged by a cam follower roller 141 that is mounted upon the end of one arm 142 of a bell crank 143. The bell crank 143, which is pivotally mounted for rotation about a shaft 144, includes an upwardly extending arm 145 that engages a pawl 146. The pawl 146 is affixed to the outward end of the shaft 54, as shown in FIGS. 1 and 8. The pawl 146 comprises a part of a second bell crank, the other arm 147 of the crank carrying an adjustable spring 148 that engages a pin 149 mounted on the bracket 55. The spring 148 biases the bell crank 146, 147 toward the raised position shown in FIG. 8, normally maintaining the shaft 54 and the lever 53 in a position such that the roller 52 is spaced from the driver roller 49 by a substantial distance.

In considering the operation of the control assembly 60, it should be understood that the starting position for each operational cycle finds the control shaft assembly in a position rotated approximately 90° from that shown in FIGS. 2, 3 and 4 to the position shown in FIG. 7. Thus, at the outset of a card feed cycle, prior to initiation of that cycle, the two dogs 87 and 88 are engaged with their respective stop surfaces 84 and 86. At this time, and as will be more apparent from the following description, the stop surfaces 84 and 86 are directly aligned with each other.

To initiate operation of the control shaft assembly 60, and thereby initiate a card feed operation, an electrical pulse signal is applied to the start electromagnet 95. Energization of the electromagnet attracts the armature 101 toward the magnet structure, pulling the operating rod 93 to the right as seen in FIG. 7. When the starting signal is appied to electromagnet 95, the stop electromagnet 94 is in a de-energized condition so that it does not resist movement of the operating rods 92 and 93 to the right. The movement of operating rod 93 pulls lever 89 to the right, pivoting the lever through a small angle in a clockwise direction. Consequently, dog 88 is released from engagement with the stop surface 86 and collar 85, releasing the control shaft 76 for rotation in the direction shown by arrow C (FIG. 7). At the same time, the other dog 87 is released from its engagement with the stop surface 84 on the clutch sleeve 83, releasing the clutch sleeve for rotational movement.

As will presently appear, in the initial starting position, the torsion bar 116 will have already stored therein energy generated at the termination of a previous cycle of operation, and this energy, now released, rotates the shafts 76 and 114 with respect to each other, bringing the mating faces 152 and 153 of the hub 105 on the shaft 76 into engagement with the corresponding faces 154 and 155 on the shoulder elements 112 and 113 of the collar 115 that is mounted on the shaft 114, as illustrated in FIG. 6. The action of the torsion bar thus helps to bring the control shaft 76 and its hub 105 up to a speed approaching that of the continuously rotating drive shaft 63 and its hub or extension section 73. That is, the initial rotation of the control shaft 76, which is the input shaft for the torsion bar section 62 of the control assembly 60, occurs in response to the stored torque of the torsion bar 116, which starts the shaft 76 rotating in the direction of the arrows C. Moreover, this action occurs before a positive drive is applied to that shaft from the drive shaft 63 by engagement of the clutch connecting the two sections 61 and 62 of the control shaft assembly.

Upon release of the clutch sleeve 83, as described above, the spring 78 starts to rotate the sleeve forwardly relative to the end portion 81 of the shaft 76. This permits the spring to contract onto the drive shaft extension 73 and thereby effectively engage the spring clutch. The clutch thus reaches full engagement under minimum inertia conditions, after control shaft 76 has already started some rotation, and enables the clutch to pick up the full load when fully engaged. When the clutch has been engaged and the stop faces 152, 154 and 153, 155 are engaged as illustrated in FIG. 6, the continuously rotating drive shaft 63 is effectively connected in a rigid driving connection to the shaft 114 through the clutch, the shaft 76, the hub 105, and the collar 115. It will be seen that the torsion bar 116 is not a part of this driving connection.

The starting position for the cam 125 is the position illustrated in FIG. 8. As is apparent from that figure, the lobe 158 on the cam 125 actuates the cam follower 141 at once. The lobe 158 drives the cam follower 141 downwardly, pivoting the bell crank 143 in a counterclockwise direction about its shaft 144. The resulting counterclockwise movement of the arm 145 of this bell crank pivots the arm 146 in a clockwise direction, turning the shaft 54 and the lever 53 in a clockwise direction and moving the support and idler roller 52 upwardly toward the feed roller 49. The movement of the idler and support roller 52 brings a card 24, which had reached this station on the previous cycle, into engagement with the feed roller 49 and the card is immediately accelerated rapidly and fed outwardly of the card feed mechanism in the direction of the arrow B (FIG. 2) to make room for another card coming from the hopper 21.

As the operating cycle continues the lobe 158 on the cam 125 clears the cam follower 141. The spring 148 (FIG. 8), acting on the crank arm 147 restores the shaft 54 and the lever 53 to their initial positions with the roller 52 spaced well below the feed roller 49. Thus, this portion of the mechanism is restored to its original condition and is ready for feeding another card on the next cycle. Of course, the bell crank 143 returns to its original position as a result of its engagement with the arm 146 of the crank attached to the shaft 54.

Virtually simultaneously with the action of cam 125 and roller 52 described immediately above, the initial rotation of the operating shaft 114 also activates the mechanism for feeding a replacement card from the hopper 21. It will be noted that the rotation of the operating shaft 114 rotates the cam 33, thus driving the picker knife 26 through a complete cycle, moving the knife first to the left to feed a card out of the hopper 21 and then back to the right to its initial position to feed a card as described hereinabove and to reset the picker knife for the next card feed operation. The card feed movement of the picker knife usually takes place during rotational movement of the control shaft assembly 60 through an angle of slightly less than 180° and the return movement also requires less than one-half rotational cycle of the control shaft assembly, depending upon the configuration of the cam 33. This card feed movement projects the bottom card 24 in the hopper 21 into feeding engagement with drive belt 36 and roller 42, whereby it is projected against stop 43 where it remains in readiness for a subsequent cycle.

Near the end of the operating cycle of the control assembly 60, an electrical signal is applied to the stop electromagnet 94. This signal may be a clock pulse generated by an appropriate timing mechanism (not shown) at a given time after the start of the card-feed cycle, the clock pulse source being arranged to develop this signal at a time corresponding to a predetermined relatively advanced position of the operating shaft 114. This electrical signal, energizing the coil 96, develops a magnetic field that pulls the armature 99 inwardly and thus pulls the operating rod 92 to the left and back to its original position as shown in FIG. 7. The resulting pivotal movement of the lever 89 brings the two dogs 87 and 88 (FIG. 2) back into position to intercept the stop surfaces 84 and 86 (FIGS. 2 and 7).

While the dogs 87 and 88 were withdrawn and the control shaft assembly 60 was commencing to rotate at the start of the operating cycle, as described above, the stop surface 84 became advanced slightly with respect to the stop surface 86 by the release action of the clutch spring 78, their relative positions during the rotational cycle of the control shaft assembly being illustrated in FIGS. 2 and 3. As a consequence, stop surface 84 is now engaged by the dog 87 before the stop surface 86 reaches its dog 88. The engagement of the dog 87 with the stop surface 84 arrests the rotational movement of the clutch sleeve 83, causing the clutch spring 78 (FIG. 5) to expand and release its grip upon the extension portion 73 of the main drive shaft 63. In this manner, the clutch is released, disengaging the input shaft 63 from the end portion 81 of the shaft 76.

Limited additional rotation of the control shaft assembly brings the stop surface 86 on the collar 85 into engagement with its dog 88 (FIGS. 2 and 7). This interrupts the rotational movement of the shaft 76 on which the collar 85 is mounted. However, the output shaft 114 of the control shaft assembly continues to rotate somewhat because of its own inertia and because of the inertia of the several component members of the assembly that are mounted on this shaft. The continued rotational movement of the shaft 114 stresses the torsion bar 116. The torsion bar absorbs the inertial energy by twisting through several degrees (or example about 12° in one application) until the faces 162 and 163 on the shoulder elements 112 and 113 on the collar 115 approach the corresponding stop surfaces 164 and 165, respectively, on the hub portion 105 of the shaft 76. The torsion bar twist is preserved by the one-way brake spring 138, which operates as an anti-backup device for the torsion bar. The complete assembly is now in its original position and is ready for another operating cycle of the card feed mechanism.

On irregularly timed "demand" or start-stop operation of the card feed mechanism, the card feeding operation can proceed very rapidly because of the shock absorption and energy storage properties of the torsion bar apparatus interconnecting the drive shaft 63 and the operating shaft 114 of the control assembly 60. As noted above, the control assembly 60 permits "demand" operation of the card feed mechanism at rates in excess of 650 cycles per minute with a complete stop in each cycle of operation. On the other hand, if continuous cyclic feeding of cards is desired, without requiring a stop in each cycle, then substantially higher speeds can be obtained because the mechanism affords a direct driving connection from the shaft 63 to the shaft 114. Thus, for continuous card feed operation regardless of demand, the stop pulse terminating each cycle of operation of the control assembly is eliminated. The start electromagnet 95 is maintained continuously energized, keeping the lever 89 free of the control shaft assembly with the dogs 87 and 88 clear of their associated stop surfaces 84 and 86. It will be recognized that, with no necessity to stop the cyclic operation of the control shaft assembly and with a direct drive afforded by that assembly, the card feed operation can proceed at substantially higher speeds.

One important feature of the present invention is the manner in which the output shaft 114 of the torsion bar section 62 of the control shaft assembly is effectively folded back upon the torsion bar 116 (FIG. 4). This telescoped arrangement permits the use of the control shaft assembly even in a machine having stringent space limitations and at the same time provides for use of a relatively long torsion bar.

From the foregoing description, it will be recognized that the full advantages of the invention are realized, with respect to smooth inertia-free pickup of the clutch, only if control shaft 76 can start rotation before the clutch is fully engaged. In the described embodiment this is accomplished by releasing shaft 76 and the clutch at the same time, relying upon the short time lag required for the clutch to engage to permit shaft 76 to start rotation in response to release of the torsion bar mechanism. If the clutch engages too rapidly for this mode of operation, its time of engagement can be adjusted to accord with the time constants of the system involving the torsion bar 116 and shaft 76, by adjusting the position of collar 82.

The electromagnet operating mechanism 90 illustrated in FIG. 7 is relatively simple in construction and can be constructed to work quite effectively. This particular mechanism, however, may present some difficulty with respect to obtaining the accurate parallel alignment of the armature faces of the two electromagnets with the ends of the cup-like magnetic structures surrounding the operating coils of the electromagnets. If the guide rods 92 and 93 are fitted snugly enough in their respective magnetic cores to achieve exact parallelism, there is occasionally some tendency for binding of the rods. If they are loose enough to afford positive insurance against any binding, minor deviations in parallelism may occur with possible impairment of the uniformity of the magnetic fields linking the armatures of the stationary magnetic structures. While these factors are normally minor, their effects may be critical, particularly where the energizing signals are of relatively short duration in a maximum speed operation.

Figure 9:
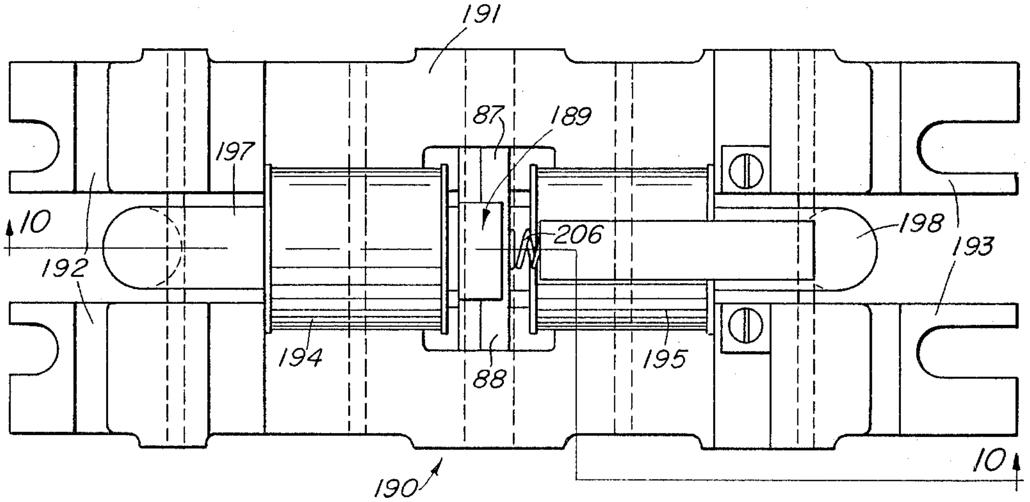
FIG. 9 is a plan view of a modified form of electromagnetic actuating device that may be incorporated in the card feed apparatus.
Figure 10:
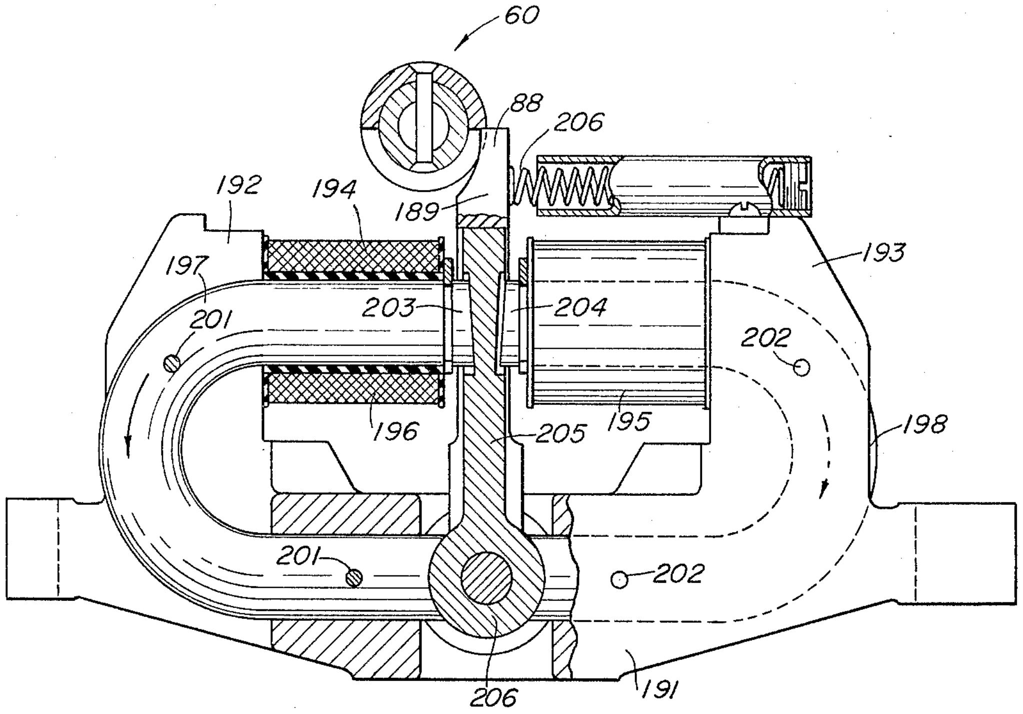
FIG. 10 is a detail sectional view taken approximately along line 10—10 in FIG. 9.

FIGS. 9 and 10 illustrate a different and presently preferred form of electromagnetic operating mechanism 190 that may be incorporated in the invention to replace the mechanism 90 of FIG. 7. The mechanism 190 comprises a base member 191 that is somewhat different in configuration from the base 91; the base member 191 includes a pair of bifurcated bracket members 192 and 193 that may be formed as an integral part of the base. A first C-shaped magnetic core member 197 is mounted in the bracket member 192 by suitable means such as the transversely extending pins 201. The upper end of the C-shaped core member 197, which projects horizontally outwardly of the bracket 192, carries a stop coil 194, the coil being disposed in encompassing relation to the cantilever portion of the core 197. The opposite side of the mechanism is of similar construction and includes a second C-shaped magnetic core member 198 mounted in the bracket 193 and secured thereto by the transversely extending pins 202. A start coil 195 is mounted on the upper horizontally projection portion of the core member 198.

The end of the core member 197 projects beyond the coil 194 and terminates in a pole piece 203. A similar pole piece 204 is formed on the end of the core member 198 projecting outwardly of the electromagnet 195. The pole pieces 203 and 204 are engageable with a high-permeability magnetic insert 205 that is a part of an operating mechanism. Thus, the magnetic insert 205 is incorporated in the central portion of the operating lever 189, the remaining portion of the operating lever being formed of a harder material, preferably steel, to provide for reasonable wear of the two dogs 87 and 88 at the top of the lever. The magnetic insert 205 extends downwardly and terminates in a cylindrical hub portion 206. The hub portion 206 of the magnetic insert for the lever is disposed between the opposed lower ends of the core members 197 and 198. The lower ends of the core members are given a configuration such that a minimum uniform air gap is afforded between each of the core members and the magnetic insert for the operating lever.

As in the case of the electromagnetic operating mechanism 90 as described above, it is desirable to afford a bias for the operating lever 189 of the mechanism 190 to provide for fail-safe operation. This is accomplished by means of a spring 206 which, in this instance, is mounted upon the upper portion of the bracket member 193 and extends into engagement with the upper portion of the lever 189. As before, the spring biases the lever toward its "stop" position.

The fundamental operation of the electromagnetic operating mechanism 190 of FIGS. 9 and 10 is essentially the same as that for mechanism 90 illustrated in FIG. 7. Thus, to stop rotation of the control shaft assembly 60, the coil 194 is energized. This produces a magnetic flux in the core 197 which is coupled to the magnetic insert 205 of the lever 189 at the hub 206 and back to the pole piece 203 of the core 197. Thus, when the coil 194 is energized, the lever 189 is attracted toward the pole piece 203, and hence toward the position illustrated in FIG. 10, pivoting the lever 189 to the left toward its stop position. Conversely, energization of the coil 195 attracts the magnetic insert 205 in the operating lever 189 toward the pole piece 204, pivoting the lever 189 in a clockwise direction to its release position.

The construction for the electromagnet operating mechanism 190 illustrated in FIGS. 9 and 10 eliminates completely any requirement for maintaining exact parallelism with respect to individual armatures for the electromagnets. The magnetic insert 205 in the lever 189 serves as an armature for both electromagnets. The rocking fit of the hub 206 of this member with the concave faces of the lower ends of the pole pieces 197 and 198 is inherently stable and can be constructed to afford a minimum uniform air gap at this part of the magnetic circuit. The concentrated ring-shaped flux paths for the two electromagnets are inherently more efficient and effective than the more complex flux paths of the embodiment of FIG. 7. The two operating faces of the magnetic insert 205, which serves as the armature for both electromagnets, once accurately formed, always maintain the required precise alignment with respect to the pole pieces 203 and 204. Furthermore, the two electromagnets 194 and 195 may be energized with signals of such polarity that when either coil is energized, the magnetic flux developed by the coil goes through the armature 205 in the opposite direction from the flux developed by the other coil, precluding any undesired effect that might result from remanant magnetization of the armature.

While the core members 197 and 198 have been described as being two individual members, it will be understood that in certain applications they may be formed as parts of a unitary member against the mid-portion of which the armature is rockably engaged, or they may be made up of separate pieces of magnetic material integrally connected to form a composite core assembly or assemblies.

While preferred embodiments of the invention have been described and illustrated, it is to be understood that these are capable of variation and modification. Accordingly, the aim in the appended claims is to cover all such variations and modifications as may fall within the true spirit of the invention.

What is claimed is:

1. A cyclically operable card feed mechanism for feeding individual record cards, one-by-one, at high speeds, from a storage magazine comprising:

- a movable feed member for engaging each successive card in the magazine to feed the card therefrom;
- an operating shaft;
- means coupling said feed member in mechanically driven relation to said operating shaft;
- a drive shaft;
- a control shaft;
- clutch means for engaging said drive shaft in mechanical driving relation to said control shaft;
- a torsion bar having one end connected to said control shaft and having its other end connected to said operating shaft;
- holding means for maintaining said control shaft stationary in predetermined angular alignment with said operating shaft and with said torsion bar stressed with a preselected torque;
- and actuating means for engaging said clutch means and releasing said holding means in predetermined timed relation to each other to permit said torsion bar to initiate rotation of said control shaft at the beginning of a card feed cycle to provide for engagement of said clutch means under minimum inertia conditions.

2. A cyclically operable card feed mechanism for feeding individual record cards, one-by-one, at high speeds, from a storage magazine comprising:

- a movable feed member for engaging each successive card in the magazine to feed the card therefrom;
- an elongate operating shaft having an axial bore extending therethrough;
- means coupling said feed member in mechanically driven relation to said operating shaft;
- a drive shaft;
- a control shaft aligned with said operating shaft;
- clutch means for engaging said drive shaft in mechanical driving relation to said control shaft;

- a torsion bar extending through the axial bore in said operating shaft and having one end connected to said control shaft and having its other end connected to said operating shaft;
- holding means for maintaining said control shaft stationary in predetermined angular alignment with said operating shaft and with said torsion bar stressed with a preselected torque;
- and actuating means for engaging said clutch means and releasing said holding means in predetermined timed relation to each other to permit said torsion bar to initiate rotation of said control shaft at the beginning of a card feed cycle to provide for engagement of said clutch means under minimum inertia conditions.

3. A cyclically operable card feed mechanism for feeding individual record cards, one-by-one, at high speeds, from a storage magazine, comprising:

- a movable feed member for engaging each successive card in the magazine to feed the card therefrom;
- an operating shaft;
- means coupling said feed member in mechanically driven relation to said operating shaft;
- a drive shaft;
- a control shaft;
- clutch means for engaging said drive shaft in mechanical driving relation to said control shaft, said clutch means including a first stop member for maintaining the clutch means disengaged;
- a torsion bar having one end connected to said control shaft and having its other end connected to said operating shaft;
- holding means, including a second stop member engageable with said control shaft, for maintaining said control shaft stationary in predetermined angular alignment with said operating shaft and with said torsion bar stressed with a preselected torque;
- and actuating means for simultaneously releasing both of said stop members to engage said clutch means and to release said holding means, said clutch means having sufficient initial time delay in engagement to permit said torsion bar to initiate rotation of said control shaft prior to clutch engagement and thereby provide for engagement of said clutch means under minimum inertia conditions.

4. A cyclically operable card feed mechanism for feeding individual record cards, one-by-one, at high speeds, from a storage magazine, comprising:

- a movable feed member for engaging each successive card in the magazine to feed the card therefrom;
- an operating shaft;
- means coupling said feed member in mechanically driven relation to said operating shaft;
- a drive shaft;
- a control shaft;
- clutch means for engaging said drive shaft in mechanical driving relation to said control shaft to rotate said control shaft in a given direction;
- a torsion bar having one end connected to said control shaft and having its other end connected to said operating shaft;
- holding means for maintaining said control shaft stationary in predetermined angular alignment with said operating shaft and with said torsion bar stressed with a preselected torque;
- said holding means including a releasable stop member for preventing rotation of said control shaft in said given direction and an anti-backup device preventing rotation of said operating shaft in the opposite direction;
- and actuating means for engaging said clutch means and for releasing said holding means stop member in predetermined timed relation to each other to permit said torsion bar to initiate rotation of said control shaft at the beginning of a card feed cycle to provide for engagement of said clutch under minimum inertia conditions.

5. A cyclically operable card feed mechanism for feeding individual record cards, one-by-one, at high speeds, from a storage magazine, comprising:

a movable feed member for engaging each successive card in the magazine to feed the card therefrom;
an operating shaft;
means coupling said feed member in mechanically driven relation to said operating shaft;
a drive shaft;
a control shaft;
clutch means for engaging said drive shaft in mechanical driving relation to said control shaft to rotate said control shaft in a given direction, including a first stop member for maintaining said clutch means disengaged;
a torsion bar having one end connected to said control shaft and having its other end connected to said operating shaft;
holding means, including a second stop member releasably engageable with said control shaft, for maintaining said control shaft stationary in predetermined angular alignment with said operating shaft and with said torsion bar stressed with a preselected torque;
first actuating means for simultaneously releasing both stop members to engage said clutch means to release said control shaft, said clutch means having sufficient time delay in engagement to permit said torsion bar to initiate rotation of said control shaft in said given direction prior to engagement of said clutch means to thereby provide for engagement of said clutch means under minimum inertia conditions;
second actuating means for re-engaging said stop members to disengage said clutch and brake said control shaft;
and an anti-backup device, included in said holding means and operatively connected to said operating shaft, permitting continued rotation of said operating shaft upon braking of said control shaft but preventing reverse rotation of said operating shaft to thereby provide for absorption of the inertia of said operating shaft at the end of a card feed cycle by re-stressing of said torsion bar in preparation for the next cycle.

6. A cyclically operable card feed mechanism for feeding individual record cards, one-by-one, at high speeds from a storage magazine, comprising:

a movable feed member for engaging each successive card in the magazine to feed the card therefrom;
an operating shaft;
means coupling said feed member in mechanically driven rotation to said operating shaft;
a drive shaft;
a control shaft;
clutch means for engaging said drive shaft in mechanical driving relation to said control shaft;
a torsion bar having one end connected to said control shaft and having its other end connected to said operating shaft;
holding means for maintaining said control shaft stationary in predetermined angular alignment with said operating shaft and with said torsion bar stressed with a preselected torque;
actuating means for engaging said clutch means and releasing said holding means in predetermined timed relation to each other to permit said torsion bar to initiate rotation of said control shaft through a limited angular displacement in said given direction, relative to said operating shaft, at the beginning of a card feed cycle to provide for engagement of said clutch under minimum inertia conditions;
and means affording a positive drive connection between said control shaft and said operating shaft, independent of said torsion bar, upon rotation of said control shaft through said angular displacement.

7. A cyclically operable card feed mechanism for feeding individual record cards, one-by-one, at high speeds, from a storage magazine, comprising:

a movable feed member for engaging each successive card in the magazine to feed the card therefrom;
an elongate hollow operating shaft;
means coupling said feed member in mechanically driven relation to said operating shaft;
a drive shaft;
a control shaft;
clutch means for engaging said drive shaft in mechanical driving relation to said control shaft;
a torsion bar extending through said operating shaft and having one end connected to said control shaft and having its other end connected to said operating shaft;
holding means for maintaining said control shaft stationary in predetermined angular alignment with said operating shaft and with said torsion bar stressed with a preselected torque;
means for adjusting said torsion bar torque, including an extension of said torsion bar projecting outwardly of said operating shaft;
and actuating means for simultaneously engaging said clutch means and releasing said holding means, the inertia of said clutch means permitting said torsion bar to initiate rotation of said control shaft at the beginning of a card feed cycle prior to engagement of the clutch means and thereby provide for engagement of said clutch under minimum inertia conditions.

8. A cyclically operable card feed mechanism for feeding individual record cards, one-by-one, at high speeds, from a storage magazine comprising:

a movable feed member for engaging each successive card in the magazine to feed the card therefrom;
an operating shaft;
means for coupling said feed member in mechanically driven relation to said operating shaft;
a driver shaft;
a control shaft;
clutch means for engaging said drive shaft in mechanical driving connection with said control shaft, including a first stop member for holding said clutch means disengaged;
a torsion bar interconnecting said control shaft and said operating shaft;
releasable holding means, including a second stop member, for maintaining said control shaft and operating shaft stationary in predetermined angular alignment with each other and with said torsion bar stressed with a preselected torque;
and actuating means for simultaneously actuating both stop members from respective stop positions to respective released positions to engage said clutch means and release said holding means, the inertia of said clutch means permitting said torsion bar to initiate rotation of said control shaft at the beginning of a card feed cycle and thereby provide for engagement of said clutch under limited load conditions, and for restoring both stop members to their respective stop positions;
said actuating means comprising a pair of opposed electromagnets each having an armature connected to both of said stop members.

9. A cyclically operable card feed mechanism for feeding individual record cards, one-by-one, at high speeds, from a storage magazine, comprising:

a movable feed member for engaging each successive card in the magazine to feed the card therefrom;
an operating shaft;
means for coupling said feed member in mechanically driven relation to said operating shaft;

a drive shaft;
a control shaft;
clutch means for engaging said drive shaft in mechanical driving connection with said control shaft, including a first stop member for holding said clutch means disengaged;
a torsion bar interconnecting said control shaft and said operating shaft;
releasable holding means, including a second stop member, for maintaining said control shaft and operating shaft stationary in predetermined angular alignment with each other and with said torsion bar stressed with a preselected torque;
said first and second stop members being mounted on a single pivotally mounted stop lever;
and actuating means for pivoting said stop lever from a first position to a second position to simultaneously actuate both stop members from respective stop positions to respective released positions to engage said clutch means and release said holding means, the inertia of said clutch means permitting said torsion bar to rotate said control shaft through a limited angle at the beginning of a card feed cycle and thereby provide for engagement of said clutch under limited load conditions, and for pivoting said stop lever back to its first position to restore both stop members to their respective stop positions,
said actuating means comprising a pair of opposed electromagnets each having an armature connected to said stop lever.

10. A card feed mechanism according to claim 9 in which said stop lever is constructed at least in part from magnetic material and serves as an armature for both electromagnets.

11. A drive and control assembly for actuating a high-speed card feed mechanism or like cyclical mechanism comprising:
a drive shaft;
a control shaft;
an operating shaft;
disengageable clutch means for engaging said drive shaft in mechanical driving connection with said control shaft;
a torsion bar interconnecting said control shaft and said operating shaft;
releasable holding means for maintaining said control shaft and operating shaft stationary in predetermined angular alignment with each other and with said torsion bar stressed with a preselected torque;
and actuating means for simultaneously engaging said clutch means and releasing said holding means, the inertia of said clutch means permitting said torsion bar to rotate said control shaft through a limited angle at the beginning of a cycle of said mechanism and thereby provide for engagement of said clutch under limited load conditions.

12. A drive and control assembly for actuating a high-speed card feed mechanism or like cyclical mechanism comprising:
a drive shaft;
a control shaft;
an operating shaft, one of said control and operating shafts being of elongate tubular construction with an axial bore of substantial length;
clutch means for engaging said drive shaft in mechanical driving connection with said control shaft, including a first stop member for holding said clutch means disengaged;
a torsion bar, having one end connected to said control shaft and having its other end connected to said operating shaft, said torsion bar extending through the axial bore of said one shaft of tubular construction;
releasable holding means, including a second stop member, for maintaining said control shaft and operating shaft stationary in predetermined angular alignment with each other and with said torsion bar stressed with a preselected torque;
and actuating means for simultaneously actuating both stop members from respective stop positions to respective released positions to engage said clutch means and release said holding means, the inertia of said clutch means permitting said torsion bar to initiate rotation of said control shaft at the beginning of each cycle of said mechanism and thereby provide for engagement of said clutch under limited load conditions.

13. A drive and control assembly for actuating a high-speed card feed mechanism or like cyclical mechanism comprising:
a drive shaft;
a control shaft;
an operating shaft;
clutch means for engaging said drive shaft in mechanical driving connection with said control shaft to rotate said control shaft in a given direction;
a torsion bar interconnecting said control shaft and said operating shaft;
releasable holding means, for maintaining said control shaft in fixed angular orientation;
additional holding means permitting rotation of said operating shaft in said given direction but preventing reverse rotation thereof, said two holding means cooperating to maintain said operating shaft and control shaft in predetermined angular alignment with each other and with said torsion bar stressed with a preselected torque;
and actuating means for simultaneously engaging said clutch means and releasing said releasable holding means, the inertia of said clutch means permitting said torsion bar to rotate said control shaft in said given direction at the beginning of a cycle of said mechanism and thereby provide for engagement of said clutch under limited load conditions.

14. A drive and control assembly for actuating a high-speed card feed mechanism or like cyclical mechanism comprising:
a drive shaft rotating in a given direction;
a control shaft;
an operating shaft;
clutch means for engaging said drive shaft in mechanical driving connection with said control shaft, including a first stop member movable between a stop position in which said first stop member holds said clutch means disengaged and a released position permitting engagement of said clutch means;
a torsion bar interconnecting said control shaft and said operating shaft;
releasable holding means for maintaining said control shaft and operating shaft stationary in predetermined angular alignment with each other and with said torsion bar stressed with a preselected torque, said holding means including a second stop member movable between a stop position engaged with said control shaft to hold said control shaft against rotation in said given direction and a released position permitting rotation of said control shaft in said given direction;
first actuating means for simultaneously actuating both stop members from their respective stop positions to their respective released positions to engage said clutch means and release said holding means, the inertia of said clutch means permitting said torsion bar to initiate rotation of said control shaft in said given direction at the beginning of a cycle of said mechanism and thereby provide for engagement of said clutch under limited load conditions;
and second actuating means for simultaneously actuating both stop members back to their respective stop positions to disengage said clutch and brake said control shaft, in the recited sequence, said torsion bar absorbing and storing the inertia energy of said operating shaft upon braking of said control shaft in preparation for the next cycle of operation.

15. A drive and control assembly for actuating a high-speed card feed mechanism or like cyclical mechanism comprising:

a drive shaft;

a control shaft;

an operating shaft;

clutch means for engaging said drive shaft in mechanical driving connection with said control shaft, including a first stop member movable between a stop position in which said stop member holds said clutch means disengaged and a release position in which said stop member permits engagement of said clutch means;

a torsion bar interconnecting said control shaft and said operating shaft;

releasable holding means including a second stop member movable between stop and release positions, for maintaining said control shaft and operating shaft stationary in predetermined angular alignment with each other and with said torsion bar stressed with a preselected torque;

and actuating means for simultaneously actuating both stop members between their respective stop positions and respective release positions to engage and release said clutch means and to release and engage said holding means, said torsion bar acting to rotate said control shaft at the beginning of each cycle of said mechanism to provide for engagement of said clutch under minimum inertia conditions, said torsion bar further acting to absorb and store the inertia energy of said operating shaft at the end of each cycle;

said actuating means comprising first and second electromagnets each mounted on one arm of a respective C-shaped magnetic core, and a pivotally mounted operating lever, connected to both stop members, constituting an armature for both of said electromagnets.

16. A mechanism capable of rapid intermittent operation comprising a drive member continuously rotating in a forward direction; a rotary load member; a rotary control member; resilient energy absorbing means connected between said control member and said load member and permitting a degree of angular displacement therebetween; a clutch operable to connect said drive member to said control member and to release the same therefrom; means associated with release operation of said clutch to stop rotation of said control member whereby said load member overthrows the control member to store energy in said energy absorbing means when the control member is stopped; anti-backup means acting on said load member to prevent retrograde rotation thereof and thereby prevent dissipation of the energy stored in said energy absorbing means by said overthrow; and means to cooperatively engage said clutch and release said stop means to permit rotation of the control means in a forward direction during the clutch engagement period by the energy stored in said energy absorbing means.

17. A device as set forth in claim 16 in which there is provided, in addition to the energy absorbing means connecting said control member and said load member, a lost motion drive connection between said control and load members positively limiting the amount of angular displacement therebetween.

References Cited by the Examiner

UNITED STATES PATENTS

| | | | |
|---|---|---|---|
| 2,342,571 | 2/1944 | Carroll | 271—18 |
| 2,692,774 | 10/1954 | Sidman | 271—18 |
| 2,895,315 | 7/1959 | Fishtahler | 64—27 |
| 3,181,040 | 4/1965 | Viale | 317—165 |
| 3,202,885 | 8/1965 | Sohns | 317—165 |

M. HENSON WOOD, Jr., *Primary Examiner.*

R. A. SCHACHER, *Assistant Examiner.*